United States Patent [19]

Sullivan et al.

[11] 4,160,879
[45] Jul. 10, 1979

[54] TELEPHONE DISPLAY ACCESSORY

[75] Inventors: Ronald L. Sullivan; Ronald R. Cosentino, both of Seneca Falls, N.Y.

[73] Assignee: M E P & I Corporation, Seneca Falls, N.Y.

[21] Appl. No.: 858,710

[22] Filed: Dec. 8, 1977

[51] Int. Cl.² ............................................. H04M 1/56
[52] U.S. Cl. ................................................ 179/90 AN
[58] Field of Search .......... 179/90 AW, 90 AT, 90 A, 179/90 R, 90 FW

[56] References Cited

U.S. PATENT DOCUMENTS

| | | | |
|---|---|---|---|
| 2,217,523 | 10/1940 | Namenyi | 179/90 AN |
| 2,877,579 | 3/1959 | Fiore | 179/90 AN |
| 3,636,319 | 1/1972 | Nixon | 179/90 AN |
| 3,674,941 | 7/1972 | Guetta | 179/90 AN |
| 3,932,709 | 1/1976 | Hoff et al. | 179/90 AN |
| 4,090,037 | 5/1978 | Benjamin et al. | 179/90 AN |

*Primary Examiner*—Kathleen H. Claffy
*Assistant Examiner*—Gerald L. Brijance
*Attorney, Agent, or Firm*—Stonebraker, Shepard & Stephens

[57] ABSTRACT

An accessory attaches to the outside of a dial telephone, fits around the dial, and has a main switch actuated by movement of the handset of the telephone. The accessory includes a rotatable element arranged to encircle the dial and a dialing switch responsive to rotation of the element and the dial to produce pulses as a number is dialed. Electronic logic circuitry processes the pulses from the dialing switch and operates displays for displaying a dialed number digit-by-digit and for spacing the dialed digits into groups conforming to telephone number digit groupings for local calls, long distance calls within the calling area, and long distance calls outside of the calling area. The accessory also preferably provides dashes between groups of displayed digits and includes a timer for automatically measuring and displaying the elapsed time of a call.

14 Claims, 8 Drawing Figures

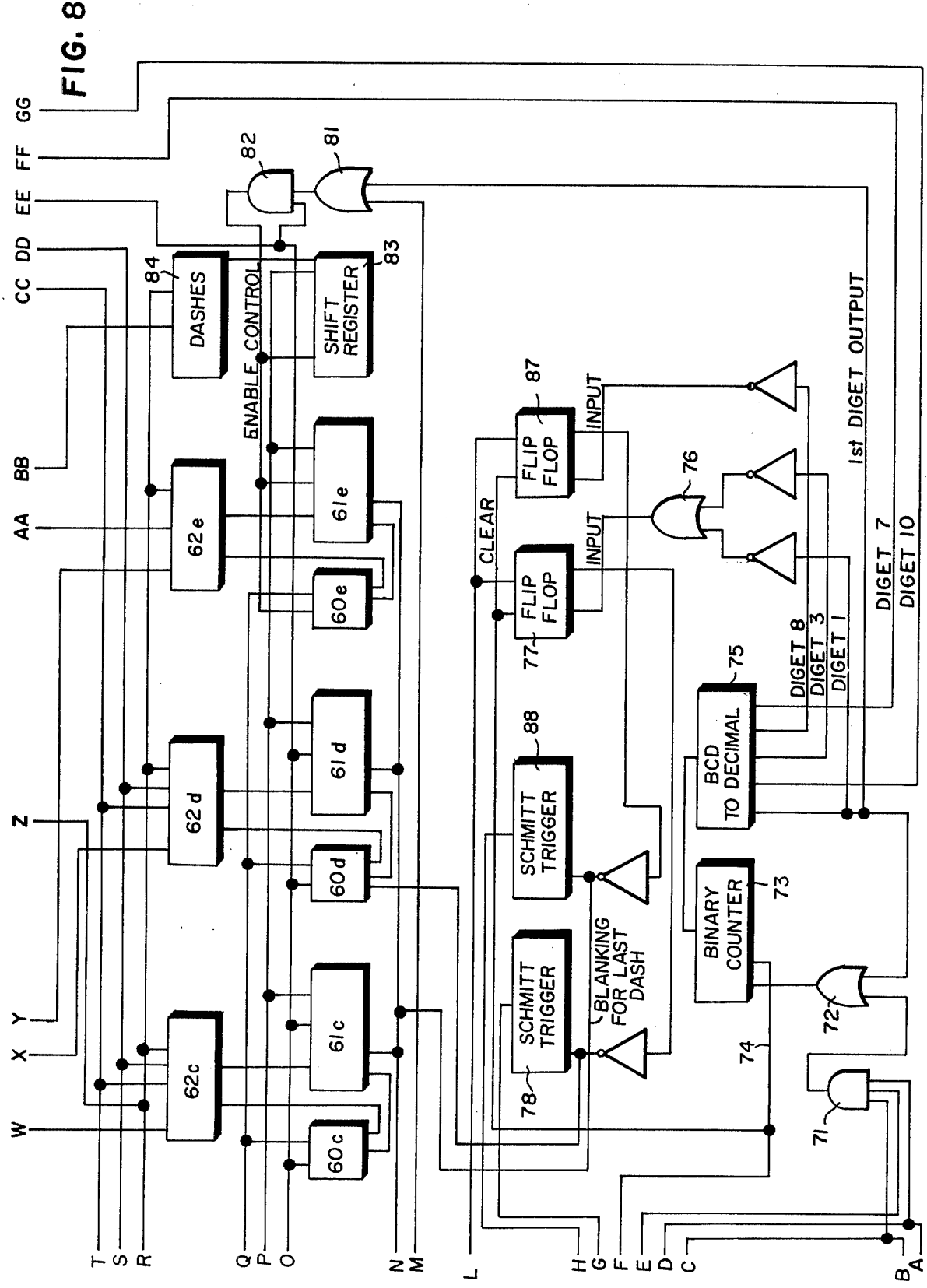

TELEPHONE DISPLAY ACCESSORY

BACKGROUND OF THE INVENTION

Relatively sophisticated equipment has been suggested for displaying telephone numbers as they are called, and devices are also available for displaying the elapsed time of telephone calls. A problem remains unsolved, however, for achieving number display, timing display, and performing other telephone-related functions in a simple device easily attachable to existing telephones.

The invention involves recognition of this problem and realization of a way of producing a display of numbers being dialed and elapsed time for telephone calls in a device that attaches to the outside of a dial telephone without requiring any modification of an existing telephone. The inventive display accessory operates without any interconnection with telephone wiring or any necessity for entering the telephone housing and thus does not interfere with existing telephone functions. The invention also aims at simplicity, economy, and reliability in a compact and easy to install device for displaying telephone numbers dialed and elapsed time of telephone calls, and for performing other functions related to telephone use.

SUMMARY OF THE INVENTION

The inventive accessory applies to a telephone having a body, a dial, a handset, and a line switch; and it includes a housing shaped to fit over an outside surface of a telephone body. A main switch is disposed in the region of the telephone line switch for actuating the accessory in response to movement of the telephone handset. A rotatable element is arranged within the accessory housing to encircle and be concentric with the telephone dial, and the rotatable element is releasably connected to the dial for rotating with the dial. A dialing switch is arranged in the housing to be responsive to the rotatable element to produce pulses as a function of rotation of the element as the telephone dial is operated. The accessory includes a dialed number display device and electronic logic circuitry arranged within the housing and responsive to pulses from the dialing switch for displaying a dialed number digit-by-digit as the dialed number is dialed. The logic circuitry also spaces the displayed digits to separate them into groups conforming to telephone number digit groupings for local calls, long distance calls within area, and long distance calls outside of area as the dialed number is dialed. The logic circuitry preferably includes a binary counter for counting pulses to determine each digit of the number called, an array of shift registers in circuit with the binary counter for successively shifting and registering each digit of the number called, and means in circuit with the shift register array for displaying each digit of the number called. The circuitry also preferably includes means in circuit with the binary counter and the shift registers for recognizing a 1 as the initial digit of a number called and for shifting an initial 1 spaced from the second digit of a number called, and means for shifting and spacing other digits of a called number to conform to telephone number digit groupings.

DRAWINGS

DETAILED DESCRIPTION

Figure 2:
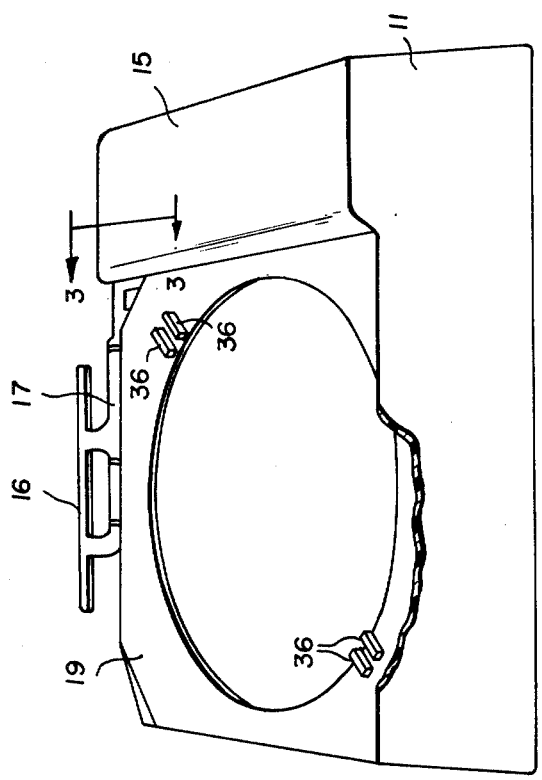
FIG. 2 is a partially cutaway, front elevational view of a base portion of a housing for the accessory of FIG. 1.

Accessory 10 has a housing including a base portion 11 shaped to fit over and attach to the housing of a standard dial telephone in a preferably snug friction fit so that housing 11 can be simply pressed in place over a dial telephone housing. The dial telephone itself is conventional and includes a base 12, a dial 13, and a handset 14 that operates a line switch (not shown) when handset 14 is lifted for making or receiving a call.

Figure 3:
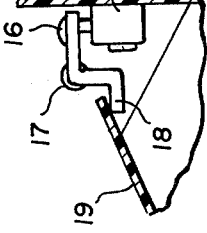
FIG. 3 is a fragmentary cross-sectional view of the base of FIG. 2, taken along the line 3—3 thereof.

As best shown in FIG. 2, accessory base 11 is formed with a compartment 15 arranged alongside a telephone to house logic circuitry, a battery power supply, and other components. It also includes a switch arm 16 mounted on a pivot rod 17 and disposed in the region of the line switch of the telephone for closing main switch 20 as handset 14 is lifted in making a call. As best shown in FIG. 3, switch arm 16 has a projection 18 that engages the underside of an upper housing wall 19 as handset 14 is replaced in its cradle to force switch arm 16 downward to open main switch 20. This relieves some of the stress on the pivot support rod 17 and insures long and reliable actuation of main switch 20 in response to movement of handset 14.

Figure 6:
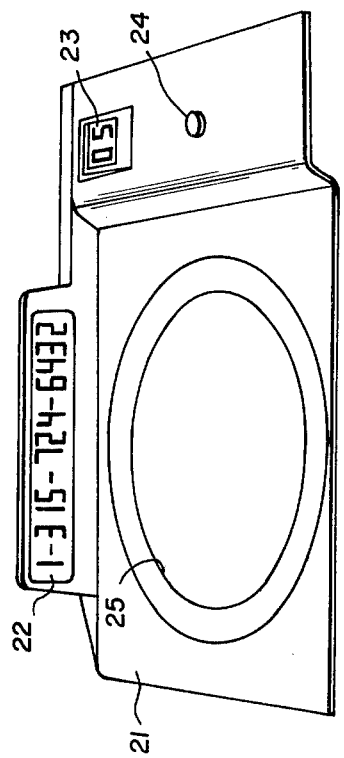
FIG. 6 is a front elevational view of a cover plate of the housing for the accessory of FIG. 1.
Figure 1:
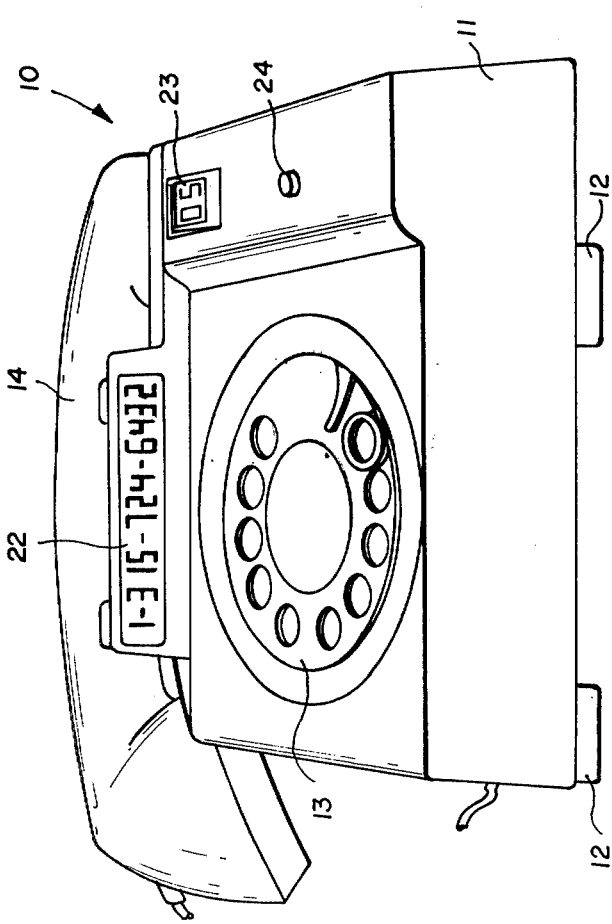
FIG. 1 is a front elevational view of a preferred embodiment of the inventive telephone display accessory.

As best shown in FIG. 6, a cover 21 fits over and encloses the top of the accessory housing and provides a number display 22 preferably arranged above the telephone dial in the region in front of the handset cradle as illustrated and an elapsed time display 23 and a timing reminder light display 24 as explained more fully below. A central opening 25 in cover 21 fits around dial 13 of the telephone.

Figure 4:
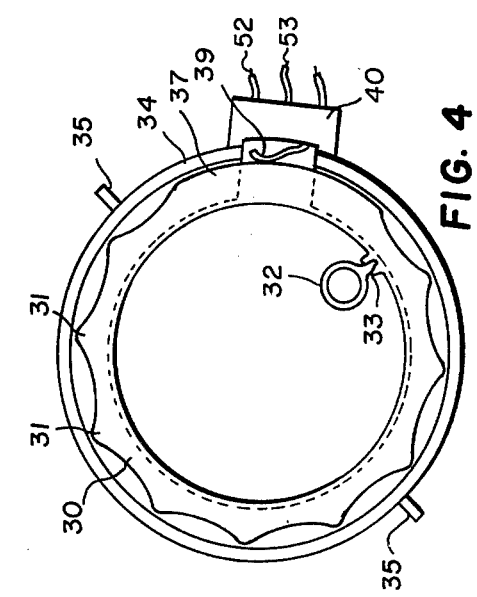
FIG. 4 is a plan view of a cam, support ring, and switch for the accessory of FIG. 1.

Accessory 10 includes an element rotatable with dial 13 and a dialing switch responsive to the rotatable element for producing pulses as a function of a number dialed. One preferred way of accomplishing this is shown in FIG. 4. A cam 30 is preferably formed of resin material and provided with lobes 31 that correspond to the number holes in dial 13. A zero ring 32 is flexibly attached to cam 30 by a resilient coupling 33, and zero ring 32 is shaped to have a friction fit interlock with the zero hole in dial 13. Cam 30 is loosely retained in a guide ring 34 within the accessory housing, and guide ring 34 has a pair of diametrically opposed trunnions 35 that fit loosely between pairs of guide blocks 36 on base 11. Trunnions 35 can move up and down to a limited extent between guide blocks 36 and also allow slight pivoting of guide ring 34 on the axis of trunnions 35 so that guide ring 34 can automatically adjust itself reliably into parallelism with the plane of dial 13. Such limited freedom of movement of guide ring 34 is desirable because the dial 13 of conventional telephones has a similar range of adjustment and cam 30 is preferably positioned to encircle dial 13 in a plane parallel with dial 13 so that cam 30 can rotate with dial 13 without friction or binding.

To install accessory 10, it is necessary to press accessory 10 down over the body of a dial telephone for a snug fit bringing guide ring 34 and cam 30 into parallel relation with dial 13 around the perimeter of dial 13. Then zero ring 32 is pressed into the zero hole of dial 13 for flexibly connecting cam 30 to dial 13, and the installation is complete. Thereafter, rotation of dial 13 in making telephone calls rotates cam 30 within its guide ring 34 without any interference with the movement of dial 13. The lobes 31 of cam 30 cooperate with a follower 39 of dialing switch 40 to produce electrical pulses as a function of each number dialed. In addition to lobes 31 corresponding to each number hole of dial 13, cam 30 has a relatively long lobe 37 corresponding with the rest position of the dial. As dial 13 is rotated, follower 39 moves in and out as the lobes 31 of cam 30 pass by, and follower 39 also assumes the position illustrated in FIG. 4 when long cam lobe 37 comes to the illustrated rest position after each number dialed.

Figures 5, 7, 8:
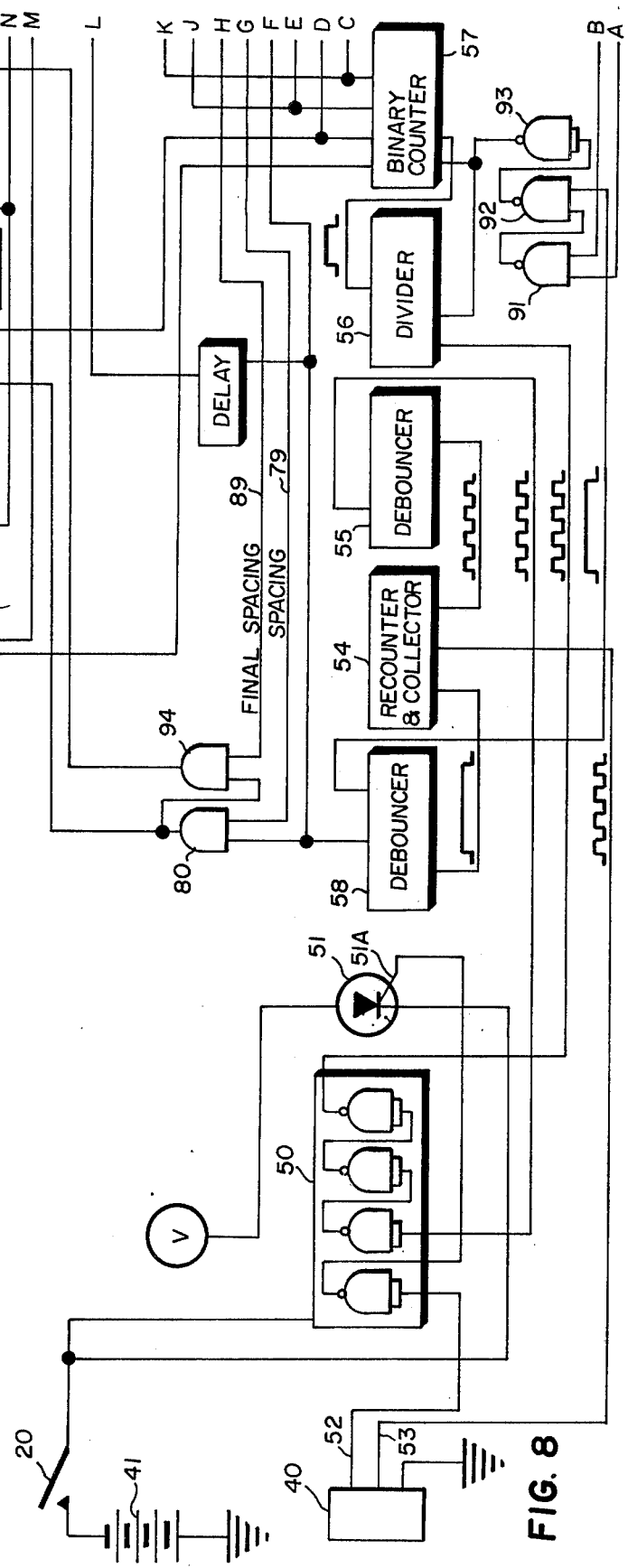
FIG. 5 is a plan view of a retainer ring for the cam of FIG. 4.
FIG. 7 is a partially schematic, plan view of an alternative preferred embodiment of a dialing switch and an element rotatable with a telephone dial for use in the accessory of FIG. 1.
FIG. 8 is a schematic diagram of a preferred embodiment of electronic logic circuitry for use in the accessory of FIG. 1.
Figure 8:
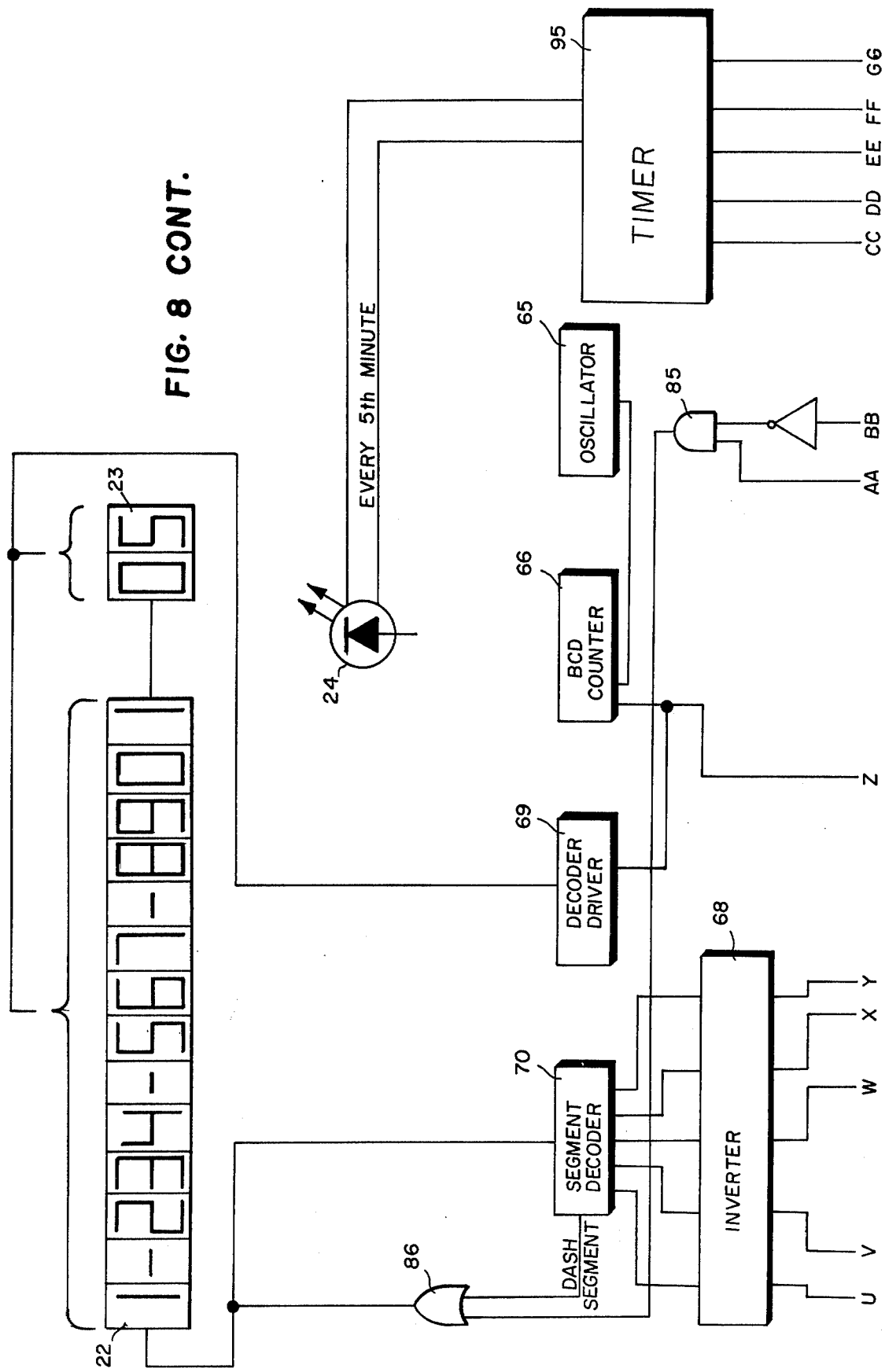

A retainer ring 38 as shown in FIG. 5 fits over cam 30 to retain cam 30 in place in guide ring 34. Many variations are possible in cams, guide rings, retainer rings, and other assemblies of cam mechanisms and switches for producing pulses as a function of a number dialed. An important consideration in all such arrangements is rotation of an element with dial 13 without requiring invasion of the telephone housing or connection to any wires or other components within the telephone. This makes the device attachable to existing telephones without any interference with telephone company equipment.

An alternative rotatable element and dialing switch are shown in FIG. 7 where dialing switch 45 includes a light source 46 and a light responsive element 47, and rotatable element 48 is a preferably thin ring that is fitted directly on dial 13 and has light reflective regions separated by non-reflective regions 49 around its perimeter to correspond with the number holes of dial 13. As each reflective region passes by light source 46 and light receiver 47, dialing switch 45 is actuated to produce a pulse so that the device of FIG. 7 operates in a way similar to cam 30 and follower 39. Also, a relatively long non-reflective region 44 is arranged on rotatable ring 48 to correspond to long cam lobe 37. The long non-reflective region is arranged so that no reflection occurs at the final rest position of the dial, and switch 45 is not actuated during an incoming call. The switch device 45 includes a source 46 of infrared light and a photovoltaic detector 47 arranged near each other and close to the ring 48 around the dial. The ring 48 is preferably formed of a plastic material that is split for fitting around the dial and has sufficient memory for snug and secure fit on the dial so that reflective regions are registered with the number holes in the dial. The output of switch 45 is amplified by an operational amplifier 42 to bring the voltage up to the preferred voltage for the logic circuitry. Dialing switch 45 then operates in a similar way to dialing switch 40 in changing between on and off states in response to rotation of an element secured to dial 13 to produce pulses as a function of a number dialed. Other rotatable elements and switches are also possible for producing pulses for the inventive accessory.

Electronic logic circuitry arranged in compartment 15 of housing base 11 is designed for processing pulses from the dialing switch to display a number being dialed in number display 22, to display the elapsed time of a telephone call in time display 23, and to operate a timing reminder buzzer or light 24 to buzz or blink periodically as an indication that a predetermined number of minutes have elapsed. Other functions can also be performed by the electronic circuitry in accessory 10 including adjustment of the remainder interval of timing device 24, memory capacity for storing and redisplaying a previous number dialed, an accessible memory of a register of frequently called numbers that can be retrieved by operating switches, a built-in clock, including a calendar clock, and even circuitry providing calculational capacity useful for computing the cost of long distance telephone calls, taxes on calls, and any other sort of calculational operations.

One preferred embodiment of electronic logic circuitry for accessory 10 is shown in FIG. 8, and many alternatives in circuitry design are possible. Integrated circuits and microprocessor chips can be used to make the circuitry compact and also capable of accomplishing all the desired functions.

Main switch 20 closes every time the telephone handset is lifted as previously explained and applies power from battery 41 to a NAND gate array 50 and to SCR 51. In the rest position of the dial, line 52 has a high output and line 53 has a low or zero output, and line 52 is connected to the gate 51A of SCR 51 through one of the NAND gates of array 50 so that closing switch 20 provides power only to NAND gate array 50. This places only a tiny drain on battery 41 when the handset is lifted for an incoming call, and the rest of the circuitry of FIG. 8 is not powered until the dial is rotated in making a call. Dialing switch 40 or 45 responds to any rotation of the dial by providing a voltage in line 52 to the gate 51A of SCR 51 which then conducts and provides the voltage to the rest of the circuit components, including the number displays, the available voltage being applied to components in generally known ways.

As a number is dialed, the dial is rotated first clockwise and then counterclockwise, and dialing switch 40 changes state as many times as the number dialed for each rotational direction of the dial to produce twice as many pulses as the number dialed. These pulses are fed through line 53 to recounter and collector circuit 54 which converts the dialed pulses into square waves and also produces relatively long pulses extending from the beginning to the end of each number dialed. The beginning and end of the long pulses is determined by movement of the long cam lobe corresponding to the rest position of the dial into registry with the dialing switch. The square wave pulses representing the number dialed are fed to debouncer circuit 55 and through a portion of NAND gate array 50 that serves to provide a slight delay, and then to divider circuit 56 that outputs half as many square waves as it receives to binary counter 57. The long pulses from recounter and collector circuit 54 are sent to debouncer circuit 58, which produces positive and negative long pulse outputs indicating the beginning and end of each number dialed.

Binary counter 57 produces a binary output in lines A–D that is transmitted to an array of split shift registers 60 A–D and 61 A–D. Shift registers 60 A–D are dual flip-flops or two-bit shift registers connected to shift register 61 A–D, which are twelve-bit shift registers cooperating with registers 60 A–D to have a fourteen-bit capacity and providing an opportunity for shifting registers 61 A–D without shifting registers 60 A–D. An array of multiplexers 62 A–D is connected to the shift register array, and the shift registers and multiplexers are in circuit with a main oscillator 65 and a bed counter 66 for scanning the number outputs to provide inputs through inverter 68, decoder driver 69, and segment decoder 70 for displaying the numbers dialed on display 22 in a way that is generally known for number display devices. The circuitry of FIG. 8 is unique in providing spaces and dashes between the displayed numbers in ways that are described more fully below.

One of the objectives of the circuitry of FIG. 8 is to space the digits of a dialed number according to conventional telephone number digit spacing and to do so automatically as the number is dialed to distinguish and properly space the digits of local calls, long distance calls within the calling area, and long distance calls outside of the calling area.

First, the illustrated circuitry distinguishes between local calls and long distance calls by the absence or presence of a 1 as the first digit dialed. A 1 produces an output in the A line from binary counter 57, and any other digit produces an output in the B, C, or D lines from binary counter 57. Outputs in the B, C, and D lines are fed to AND gate 71, which outputs to OR gate 72 in a reset line to binary counter 73. If an initial 1 is dialed, no input reaches binary counter 73 or bcd to decimal counter 75, and an end-of-digit pulse reaching binary counter 73 through line 74 finds no output as an indication that the first digit dialed was a 1. Therefore, bcd to decimal counter 75 remains in its original state, which puts a high logic output through OR gate 76 to flip-flop 77, which actuates schmitt trigger 78 to produce a spacing pulse in line 79 that is effective upon the end-of-digit pulse at AND gate 80 for shifting the initial 1 to the second position on the shift register 60 A and also shifting any logic on registers 60 B–E one space. Shift register 83 is supplied with a constant high input to produce a dash output fed to multiplexer 84, which is applied whenever a blank space is created to the segregated G or dash segment decoder OR gate 86 for energizing the dash bar of number display 22. Gates 81 and 82 are used as enable controls to eliminate unwanted logic on shift registers 60 E and 61 E when the circuitry is initially energized.

Binary counter 73 also recognizes any number other than 1 by an input from AND gate 71 and provides an output to counter 75 which is arranged to count every digit dialed except an initial 1. Dialing of a third digit, either with or without an initial 1, produces a digit 3 output from counter 75 through OR gate 76 to flip-flop 77 for actuating schmitt trigger 78 to produce another spacing pulse in line 79 for producing a space and a dash behind a three digit group. Thus, if a local call is dialed, a space occurs after the first three digits; and if a long distance call is dialed, a space occurs after the initial 1 and after the first three digits following an initial 1.

The next digit grouping depends upon whether the call is local (four digits), long distance within area (four digits), or long distance out of area (three digits). This is resolved by responding to dialing of an eighth digit as counted by counter 75, exclusive of any initial 1 digit that is specially provided for. Dialing of an eighth digit produces a digit 8 output from counter 75 to flip-flop 87 that actuates schmitt trigger 88 to produce a final spacing pulse in line 89 for shifting registers 61 A–E independently of registers 60 A–E to insert a space and a dash between the sixth and seventh digits dialed. The split between registers 60 A–E and 61 A–E makes this possible, and the difference in routes between the final spacing pulse and earlier spacing pulses is accomplished at AND gate 94.

Shift registers 60 E and 61 E cooperate with multiplexer 62 E to achieve blanking and spacing preventing zeros from appearing where not desired on display 22 and for shifting the spaces between digit groupings. Instead of representing a dialed zero as a binary 10 with outputs in line B and D from binary counter 57, B and D line outputs are fed through inverter 91 to inverter 92 which responds to an end-of-digit pulse to provide an input to inverter 93 that resets divider circuit 56 and counter 57 and provide low or zero logic in the output lines from counter 57 to represent a zero. Components downstream from counter 57 are arranged to accept zero outputs from binary counter 57 as a representation of a dialed zero, which is then displayed and shifted in the same way as other dialed numbers.

Timer circuitry 95 receives a pulse from a digit seven count of counter 75 to start measuring elapsed time, and timer circuit 95 has reset capacity so that the timed interval can be reset. The timer circuitry is initially adjusted to reset once after a predetermined interval of, for example, 20 seconds to allow an average time for a few telephone rings before connection to the party being called. Timer 95 also resets upon dialing of more than seven digits and is triggered again by dialing of a tenth digit to recommence measuring a timed interval.

A generally known cascade timer is included in timer circuitry 95 for counting seconds, tens of seconds, minutes, and tens of minutes, and output from timer circuitry 95 is used for driving minute display 23. Another output from timer circuitry 95 is selected to energize reminder device 24 at predetermined intervals such as every fifth minute. A flash from light 24 every few minutes reminds the user that the accessory is working and calls attention to the elapsed time, which might otherwise be overlooked. Another output from timer 95 at the end of an interval such as 2 minutes after dialing a call is used to clear the shift register array and deenergize number display 22 to conserve energy. Also, as mentioned above, timer circuitry 75 can be arranged to include a clock, a calendar clock, and to provide adjustably set or reset intervals controlled by the user.

We claim:

1. An accessory for a telephone having a body, a dial, a handset, and a line switch, said accessory comprising:
   (a) a housing shaped to fit over an outside surface of said telephone body;
   (b) a main switch disposed in the region of said line switch for actuating said accessory in response to movement of said handset;
   (c) a rotatable element arranged within said housing to encircle and be concentric with said dial;
   (d) means for releasably connecting said rotatable element to said dial for rotating with said dial;
   (e) a dialing switch arranged within said housing to be responsive to said rotatable element to produce pulses as a function of rotation of said element;
   (f) a dialed number display device; and
   (g) electronic logic circuitry arranged within said housing and responsive to said pulses from said dialing switch for:

(1) displaying a dialed number digit-by-digit as said dialed number is dialed; and
(2) spacing said displayed digits to separate said displayed digits into groups conforming to telephone number digit groupings for local calls, long distance calls within area, and long distance calls outside of area as said dialed number is dialed.

2. The accessory of claim 1 including a timer, a device for displaying elapsed time, and means for starting said timer to measure and display said elapsed time beginning at a predetermined interval after completion of dialing of said dialed number.

3. The accessory of claim 2 including an indicator device and wherein said timer is arranged for energizing said indicator device at predetermined intervals during said elapsed time.

4. The accessory of claim 2 including means responsive to said timer for turning off said dialed number display after a predetermined interval of said elapsed time.

5. The accessory of claim 1 including means within said circuitry for displaying dashes between spaced-apart digits of said dialed number.

6. The accessory of claim 1 including means for energizing said logic circuitry and said display device in response to dialing a first digit of said dialed number so said logic circuitry and said display device are not energized by closure of said main switch during an incoming call.

7. The accessory of claim 6 including a timer, a device for displaying elapsed time, and means for starting said timer to measure and display said elapsed time beginning at a predetermined interval after completion of dialing of said dialed number.

8. The accessory of claim 7 including means responsive to said timer for turning off said dialed number display after a predetermined interval of said elapsed time.

9. The accessory of claim 1 wherein said rotatable element has light reflective regions corresponding to numbered openings in said dial, and said dialing switch is responsive to light reflected from said regions of said rotatable element.

10. The accessory of claim 1 wherein said rotatable element is a cam and said dialing switch includes a follower engaging said cam.

11. The accessory of claim 10 wherein said housing includes an annular guide for said cam and said cam is loosely rotatable within said guide.

12. The accessory of claim 11 wherein said guide lies in a plane and is tiltable relative to said housing to bring said plane of said guide into parallel relation with the plane of said dial on said telephone.

13. The accessory of claim 10 including an annular ring having a friction fit in a 0-position opening in said dial, and a flexible element connecting said ring to said cam.

14. The accessory of claim 10 wherein said cam has short lobes corresponding to numbered oenings in said dial and a relatively long lobe corresponding to a rest position of said dial.

* * * * *